United States Patent [19]

McAnally

[11] 4,349,169

[45] Sep. 14, 1982

[54] CONTINUOUS FORCE ACTUATOR

[75] Inventor: Robert W. McAnally, Fort Worth, Tex.

[73] Assignee: The United States of America as represented by the Secretary of the Air Force, Washington, D.C.

[21] Appl. No.: 178,042

[22] Filed: Aug. 14, 1980

[51] Int. Cl.³ .......................... B64C 3/48; F01B 19/04
[52] U.S. Cl. ......................................... 244/219; 92/48; 92/128; 92/169; 244/213; 244/75 R
[58] Field of Search ................................. 244/216–219, 244/215, 214, 213, 78, 75 R; 92/117 R, 117 A, 66, 61, 128, 151, 169, 171, 37, 39, 89–92, 48, 98, 120, 64

[56] References Cited

U.S. PATENT DOCUMENTS

| | | | |
|---|---|---|---|
| 326,280 | 9/1885 | Evered | 92/61 |
| 365,647 | 6/1887 | Solano | 92/61 |
| 2,463,900 | 3/1949 | Nicholson | 121/48 |
| 2,465,560 | 3/1949 | Warnke | 92/92 |
| 2,467,883 | 4/1949 | Edwards, Jr. | 92/92 |
| 2,473,646 | 6/1949 | Hollerith | 92/90 |
| 2,987,004 | 6/1961 | Murray | 103/149 |
| 3,016,884 | 1/1962 | Merriman | 121/48 |
| 3,047,257 | 7/1962 | Chester | 244/85 |
| 3,076,623 | 2/1963 | Lyon | 244/219 |
| 3,137,214 | 6/1964 | Feld et al. | 92/48 |
| 3,172,166 | 3/1965 | Imbrecht | 20/4 |
| 3,179,357 | 4/1965 | Lyon | 244/219 |
| 3,202,061 | 8/1965 | Johnston | 92/37 |
| 3,229,590 | 1/1966 | Huska | 92/48 |
| 3,375,619 | 4/1968 | Hurkamp | 52/2 |
| 3,785,567 | 1/1974 | Fisher | 239/265.39 |
| 3,935,795 | 2/1976 | Hawley | 92/39 |
| 3,958,368 | 5/1976 | Crosa | 29/257 |

FOREIGN PATENT DOCUMENTS 569764  8/1977  U.S.S.R. ................................. 92/90

*Primary Examiner*—Galen L. Barefoot
*Attorney, Agent, or Firm*—Donald J. Singer; Jacob N. Erlich

[57] ABSTRACT

A continuous force actuator having a housing, a pair of slidably mounted T-shaped pistons therein and a plurality of resilient, hollow pressure tubes surrounding each of the pistons. The insertion of fluid into or the removal of fluid from the resilient tubes alters the position of the pistons relative to the housing and thereby controls the continuous force applied by the actuator. By operably connecting the continuous force actuator between opposite components of, for example, a variable configurated airfoil, continuous control of the airfoil configuration can be performed in a reliable and accurate manner.

2 Claims, 4 Drawing Figures

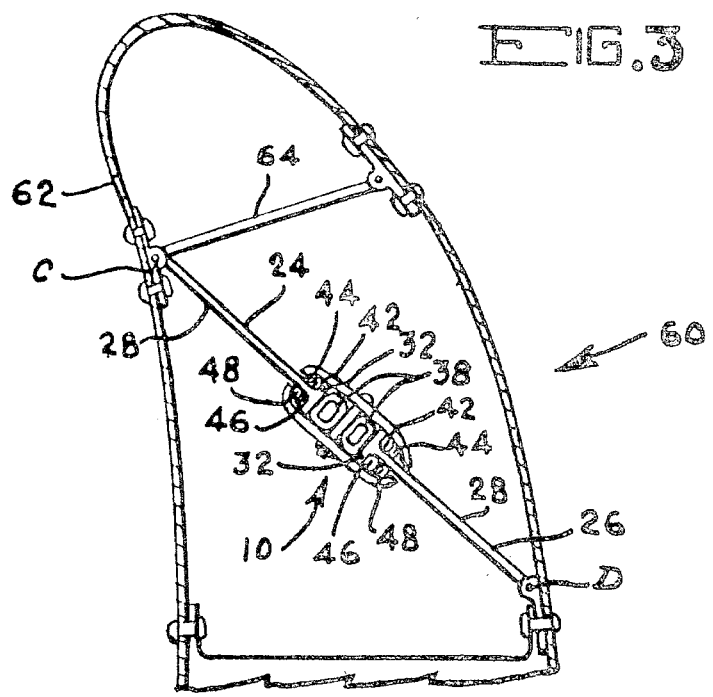
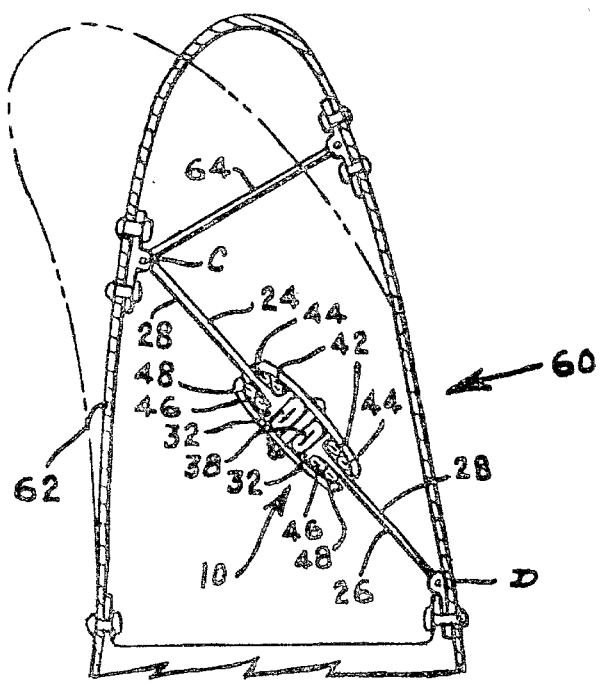

CONTINUOUS FORCE ACTUATOR

STATEMENT OF GOVERNMENT INTEREST

The invention described herein may be manufactured and used by or for the Government for govermental purposes without the payment of any royalty thereon.

BACKGROUND OF THE INVENTION

This invention relates generally to actuators, and, more particularly to an actuator which by the application or removal of fluid from a plurality of pressure tubes is capable of providing a continuous force.

In general, actuators are designed in the form of piston and cylinder arrangements. There are many instances where such an actuation system is unacceptable, either because the motive force provided is insufficient, actuation is unreliable, and/or the overall cost of the actuator fails to fall within the cost limitations of the system in which the actuator is used.

Some systems in which currently available actuators may be less than desirable would be, for example, in driving the forming head of a sheet metal brake forming machine, driving the clamping jaws on a two-way or four-way stretch forming machine, applying appropriate force to the segmented brake shoes on wheel brakes and varying the chord or diagonal member dimensions in a variable geometry truss as applied to a variable camber leading or trailing edge device.

The latter application is of particular interest since the variable camber concept offers significant improvement in the overall aerodynamic efficiency of aircraft such as the FB-111 that operate in a variety of different mission segments. The efficiency improvement of such aircraft is obtainable by means altering the chordwise and spanwise geometry of the wings to provide optimum aerodynamic characteristics during takeoff, climb out, subsonic cruise, in-flight refueling, subsonic sea level or high altitude dash, supersonic cruise and landing.

Actuators which have been considered for varying the wing geometry generally include conventional hydraulic actuators, power hinges or screw jacks which could be utilized with cables, pulleys and actuating linkages in order to produce such movement. Unfortunately, as the operating speeds of aircraft increase, conventional actuating means have proven to be unsatisfactory and inadequate in obtaining sufficient alteration of the wing or airfoil design. Consequently, there arises a need for not only an improved actuator which is capable of providing continuous force but also an actuator which is readily adaptable for use in varying the chord or diagonal dimensions in a variable geometry truss such as found in the airfoil of today's aircraft.

SUMMARY OF THE INVENTION

The instant invention overcomes the problems encountered in the past by providing a continuous force actuator which relies upon the application or removal of fluid pressure within a plurality of elongated resilient, tubular members. The tubular members are operably interconnected to a pair of pistons capable of moving control surfaces or the like.

The continuous force actuator of this invention is made up of a pair of T-shaped pistons which are arranged between and slidable within two C-shaped housing members. The C-shaped members are bolted or fastened to a separator bar thereby forming a pair of chambers therebetween, one for each of the slidable T-shaped pistons. Tubular shaped members or pressure tubes occupy the space between the separator bar and the outer surface of the heads of the pistons as well as between the heads of the pistons and the inside flange areas of the C-shaped housing members.

Any suitable conventional fluid supply source is connected to the tubular shaped members or pressure tubes in order to provide fluid to either individual or to a predetermined number of tubes in order to precisely alter the position of the pair of T-shaped pistons. By applying the appropriate amount of fluid pressure to the various tubular shaped members the position of the T-shaped pistons may be either retracted or expanded accordingly.

Generally in use within the airfoil of an aircraft, any number of the continuous force actuators of this invention may be utilized in conjunction with a plurality of truss members. The truss members are so arranged within the airfoil structure to produce the desired leading edge excursions from the full-up supersonic cruise position to the full-down high lift position. Since the actuator of this invention is capable of providing a large force for continuous periods of time and for precise movement of the pistons, alteration of the airfoil configuration can be produced in an effective, reliable and low cost manner.

It is therefore an object of this invention to provide an actuator which produces an output of continuous force.

It is another object of this invention to provide a continuous force actuator which allows for precise movement of the components secured thereto.

It is a further object of this invention to provide a continuous force actuator which is extremely durable in construction.

It is still a further object of this invention to provide a continuous force actuator which is economical to produce and which utilizes conventional, currently available components that lend themselves to standard mass producing manufacturing techniques.

For a better understanding of the present invention together with other and further objects thereof, reference is made to the following description taken in conjunction with the accompanying drawing and its scope will be pointed out in the appended claims.

DETAILED DESCRIPTION OF THE DRAWING

FIG. 3 is a side elevational view, shown partly in cross section, of the continuous force actuator of this invention in use within an airfoil structure; and FIG. 4 is a side elevational view, shown partly in cross section, of the continuous force actuator of this invention shown in use within an airfoil structure depicting a different position of the airfoil and in which the airfoil position of FIG. 3 is shown in phantom.

DETAILED DESCRIPTION OF THE PREFERRED EMBODIMENT

Figure 1:
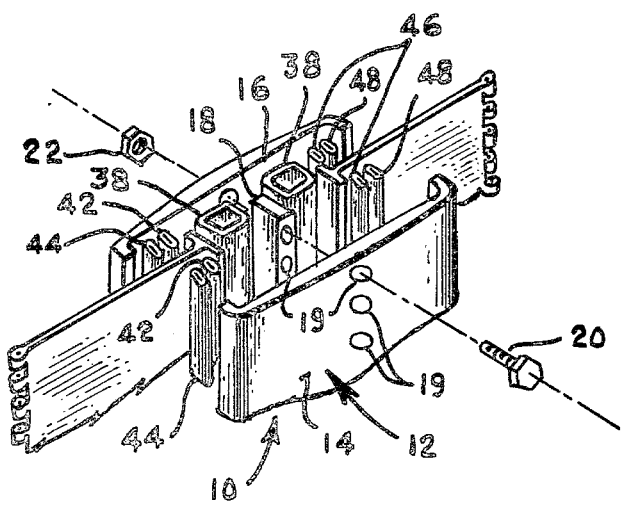
FIG. 1 is an exploded, pictorial representation of the continuous force actuator of this invention.
Figure 2:
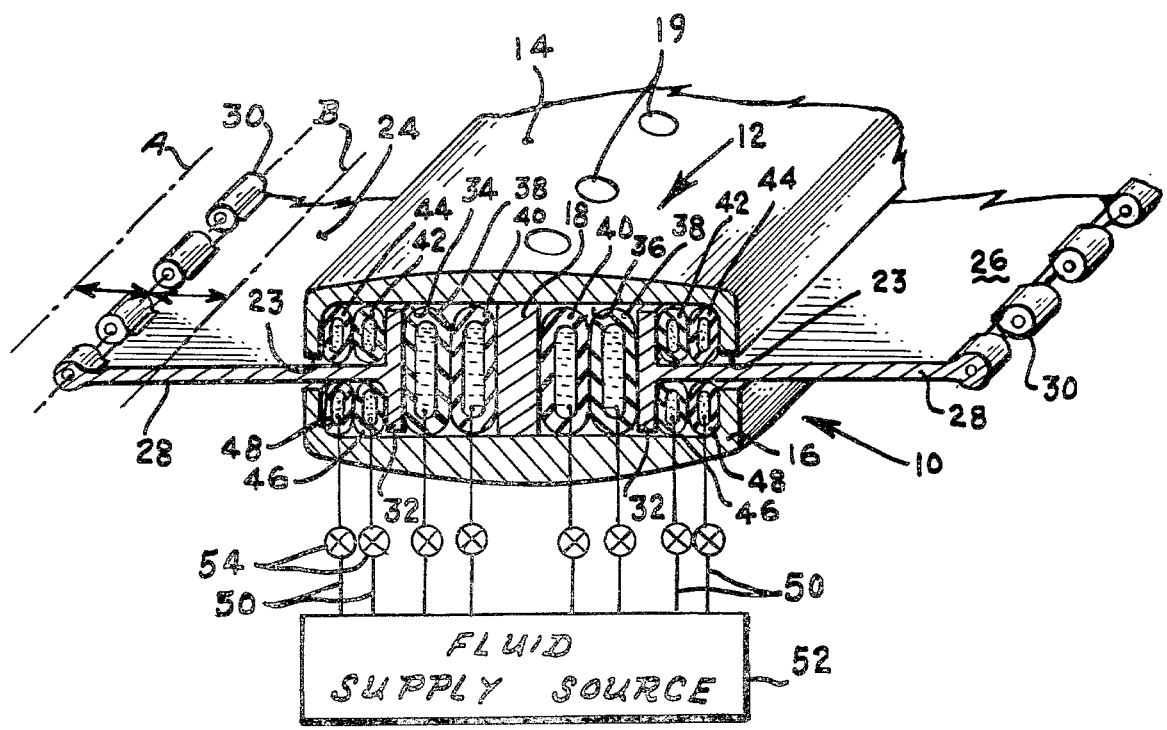
FIG. 2 is a pictorial, cross sectional view of the continuous force actuator of this invention.

Reference is now made to FIGS. 1 and 2 of the drawing which clearly illustrates the continuous force actuator 10 of this invention. Actuator 10 is made up of a housing 12 which may be in the form of two C-shaped members 14 and 16. Members 14 and 16 are held in a spaced apart relationship by a separator bar 18 mounted therebetween. Separator 18 as well as members 14 and 16 have a plurality of aligned holes 19 formed therein in order to enable any conventional securing means such as bolts 20 to pass therethrough. Nuts 22 are fastened to bolts 20 thereby securely positioning members 14 and 16 in place. The width of separator bar 18 is designed so that a space 23 is formed at each end of housing 12 between members 14 and 16 to allow a pair of T-shaped pistons 24 and 26 to slidably move between members 14 and 16 in a manner to be described in detail hereinbelow.

Pistons 24 and 26 are of identical construction and therefore only one such piston 24 will be described in detail. For clarity, identical numerals are used in identifying similar elements of each piston 24 and 26. Piston 24 is made of an elongated element or arm 28 having a hinge-like fitting 30 at one end thereof and a head in the form of a T-shaped protrusion 32 at the other end.

Each piston 24 and 26 has elongated arm 28 slidably mounted between members 14 and 16 so as to pass through opening 23. The T-shaped protrusion 32 of each piston 24 and 26 slidably fits within chambers 34 and 36, respectively, formed between separator bar 18 and the ends of C-members 14 and 16, respectively.

Each T-shaped piston 24 and 26 is held in slidable relationship within chambers 34 and 36 by a plurality of pressure tubes which occupy the space surrounding T-shaped pistons 24 and 26. Although any number of suitable pressure tubes may be located within chambers 34 and 36 an operable embodiment of this invention would encompass the utilization of five such pressure tubes located within each chamber 34 and 36 as shown in FIG. 1 of the drawing or six such pressure tubes as shown in FIG. 2.

Since the make-up of each chamber 34 and 36 is identical, the following description will be with reference to only chamber 34 with identical numerals being utilized for the pressure tubes situated within chamber 36. For example, one or two large elongated pressure tubes 38 (or 38 and 40) are situated within chamber 34 interposed between the base of the T-shaped protrusion 32 of piston 24 and separator bar 18. Located between the inner portion of T-shaped protrusion 32 and an end of housing 12 along one side of elongated element 28 are a pair of pressure tubes 42 and 44 located on the other side of element 28 are an identical pair of pressure tubes 46 and 48. The same type of relationship between pressure tubes are set forth in chamber 36. The elongated arms 28 of each T-shaped piston 24 and 26 protrude through the openings 23 formed between adjacent C-shaped members 14 and 16.

Any conventional source of fluid, either gaseous or liquid may be supplied to the pressure tubes 38, 40, 42, 44, 46, and 48 by a series of pressure lines 50 interconnecting the tubes to a conventional pressurized fluid source 52. Two-way valves 54 may be situated within each line 50 so as to regulate the amount of fluid supplied to each of the pressure tubes. In some instances it may be desirable to simultaneously actuate and deactuate valves 54 in order to control the amount of fluid pressure to the tubes or if desired each tube may be regulated independently by valves 54 situated within the lines 50.

Generally, in use, the continuous force actuator 10 of this invention has one of the T-shaped pistons (26, for example) fixedly secured to a supporting structure while the other T-shaped piston 24 is movable with respect thereto. Applying fluid pressure to selective pressure tubes will move piston 24 to an extended position designated by line A or to a retracted position designated by line B.

The continuous force actuator 10 of this invention has many applications, as for example in driving the forming head of a sheet metal brake forming machine or driving the clamping jaws in a two-way or four-way stretch forming machine. One of the more significant uses of the continuous force actuator 10 of this invention involves varying the chord or diagonal member dimensions in a variable geometry truss as applied to a variable camber leading trailing edge device such as an airfoil. Such as device is clearly depicted in FIGS. 3 and 4 of the drawing.

Reference is now made to FIGS. 3 and 4 of the drawing wherein the continuous force actuator 10 of this invention is shown in position and in use within the airfoil 60 of an aircraft (not shown). In general, the airfoil 60 in which the actuator 10 of this invention is utilized is one which is formulated of a flexible outer skin surface 62 and therefore which is capable of taking on a variable configuration such as the configurations shown in FIGS. 3 and 4 of the drawing.

In order to provide for this variable configuration of airfoil 60, a plurality of linkages in the form of truss or support members 64 may be pivotally interconnected within skin surface 62 of airfoil 60. In order to provide the motor force necessary for positioning airfoil 60 the continuous force actuator 10 of this invention is interconnected between, for example, the upper and lower flexible skin surfaces 62 as shown in FIGS. 3 and 4 of the drawing. As indicated in FIGS. 3 and 4 of the drawing, elongated arm 28 of T-shaped piston 24 is secured at point C to outer skin 62 while the other elongated arm 28 of piston 26 is secured at point D enabling the movement of airfoil 60 to take place between the position shown in FIG. 3 of the drawing and the position shown in FIG. 4 of the drawing. The phantom lines illustrated in FIG. 4 shows the relative movement of airfoil 60. By the appropriate application and removal of fluid pressure to the pressure tubes of continuous force actuator 10 of this invention movement of T-shaped piston 24 takes place such as to regulate the configuration of airfoil 60.

For example, as shown in FIG. 3 of the drawing by the removal of pressurized fluid to pressure tubes 42, 44, 46 and 48 in chambers 34 and 36 and the application of pressurized fluid from pressure tubes 38 airfoil 60 can take on the configuration shown in FIG. 3 of the drawing. By the reversal of fluid input and output and therefore the application of pressurized fluid from pressure tubes 42, 44, 46 and 48 and the application of fluid pressure to tubes 38 airfoil 60 may take on the configuration shown in FIG. 4 of the drawing.

By utilization of continuous force actuator 10 within, for example, a variable airfoil 60 as shown in FIGS. 3 and 4 of the drawing a change in the chordwise and spanwise geometry of such an airfoil 60 is possible thereby enhancing the aerodynamic characteristics of an aircraft during takeoff, climbout, subsonic cruise, in-flight refueling, supersonic sea level or high level dash, supersonic cruise and landing.

Although this invention has been described with reference to a particular embodiment, it will be understood to those skilled in the art that this invention is also capable of further and other embodiments within the spirit and scope of the appended claims.

I claim:

1. A continuous force actuator comprising:
   a housing, said housing being formed by a pair of C-shaped members, means for securing said C-shaped members together at substantially the midpoint thereof to form first and second substantially identical chambers, and a first and second space formed between respective ends of said pair of C-shaped members;
   a first piston located within said first chamber and a second piston located in said second chamber, each of said pistons having an elongated arm terminating in a T-shaped protrusion extending from one end thereof, said T-shaped protrusions being slidable within said first and said second chambers, respectively, and said elongated arms being slidable within said first and second spaces, respectively, said pistons providing said continuous force;
   means provided within each of said chambers for altering the position of said pistons located therein, each of said position altering means including a hollow resilient tube between one side of said T-shaped protrusion and said securing means, and a pair of hollow resilient tubes adjacent each side of said elongated arm on the other side of said T-shaped protrusion, said plurality of hollow resilient tubes also acting as a guide for said elongated arm situated within each of said chambers; and
   means operably connected to said position altering means for providing a motive force thereto, whereby said motive force providing means determines the amount of said continuous force.

2. In a variable configured airfoil having a first surface and a second surface, the improvement therein being in the form of at least one continuous force actuator operably connected between said first and said second surfaces, said continuous force actuator comprising:
   a housing, said housing being formed by a pair of C-shaped members, means for securing said C-shaped members together at substantially the midpoint thereof to form first and second substantially identical chambers, and a first and second space formed between respective ends of said pair of C-shaped members;
   a first piston located within said first chamber and a second piston located in said second chamber, each of said pistons having an elongated arm terminating in a T-shaped protrusion extending from one end thereof, said T-shaped protrusions being slidable within said first and said second chambers, respectively, and said elongated arms being slidable within said first and second spaces, respectively, and operably attached between said airfoil surfaces, said pistons providing said continuous force to said first and said second surfaces;
   means provided within each of said chambers for altering the position of said pistons located therein, each of said position altering means including a hollow resilient tube between one side of said T-shaped protrusion and said securing means, and a pair of hollow resilient tubes against each side of said elongated arm on the other side of said T-shaped protrusion, said plurality of hollow resilient tubes also acting as a guide for said elongated arm situated within each of said chambers; and
   means operably connected to said position altering means for providing a motive force thereto, whereby said motive force providing means determines the amount of said continuous force and thereby the configuration of said air foil.

* * * * *